No. 734,435. PATENTED JULY 21, 1903.
L. SCHULER & J. ERICSON.
CABLE GRIP OR CLUTCH DEVICE.
APPLICATION FILED MAR. 26, 1903.
NO MODEL. 2 SHEETS—SHEET 1.

WITNESSES:
J. J. Brophy
E. E. Ellis

INVENTORS
Ludwig Schuler
Joseph Ericson
BY
Munn
ATTORNEYS.

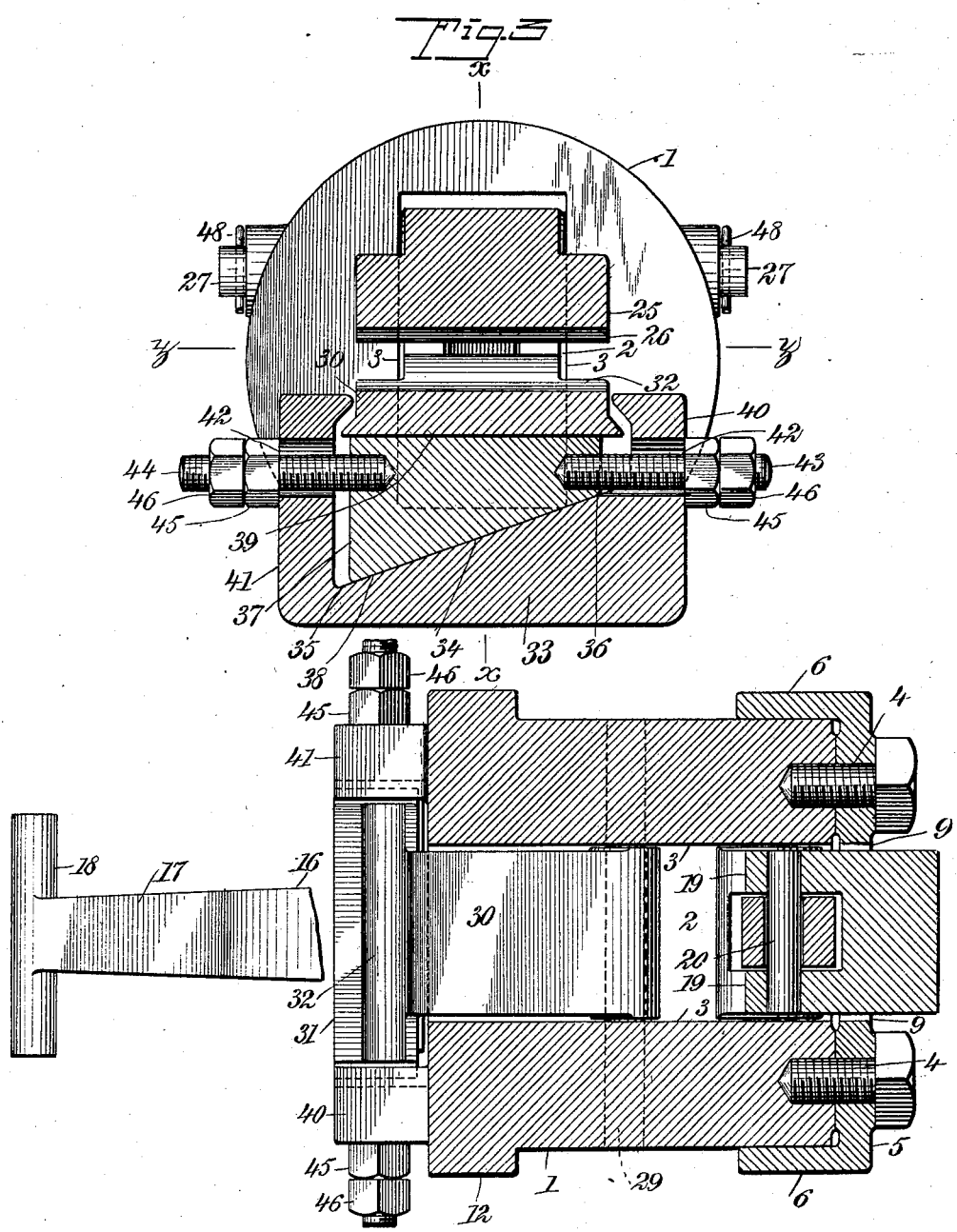

No. 734,435. Patented July 21, 1903.

UNITED STATES PATENT OFFICE.

LUDWIG SCHULER AND JOSEPH ERICSON, OF TELLURIDE, COLORADO.

CABLE GRIP OR CLUTCH DEVICE.

SPECIFICATION forming part of Letters Patent No. 734,435, dated July 21, 1903.

Application filed March 26, 1903. Serial No. 149,655. (No model.)

*To all whom it may concern:*

Be it known that we, LUDWIG SCHULER and JOSEPH ERICSON, citizens of the United States, and residents of Telluride, in the county of San Miguel and State of Colorado, have invented a new and Improved Cable Grip or Clutch Device, of which the following is a full, clear, and exact description.

This invention relates to clutches or gripping devices; and it consists substantially in the improvements hereinafter particularly described and claimed.

The invention has reference more especially to clutches or gripping devices such as are employed in connection with the traveling ropes or cables of traction or other similar railways; and the principal object of the invention is to provide a grip or device of this kind which is effective and reliable in use or operation, besides being capable of easy control and manipulation, and one also not liable to get out of order nor easily broken nor dislocated in any part thereof.

A further object of the invention is to provide a cable-grip possessing considerable strength and one also comprising few parts or elements which are simple both in the construction and organization thereof.

The above and additional objects are attained by means substantially such as are illustrated in the accompanying drawings, in which—

Figure 1:
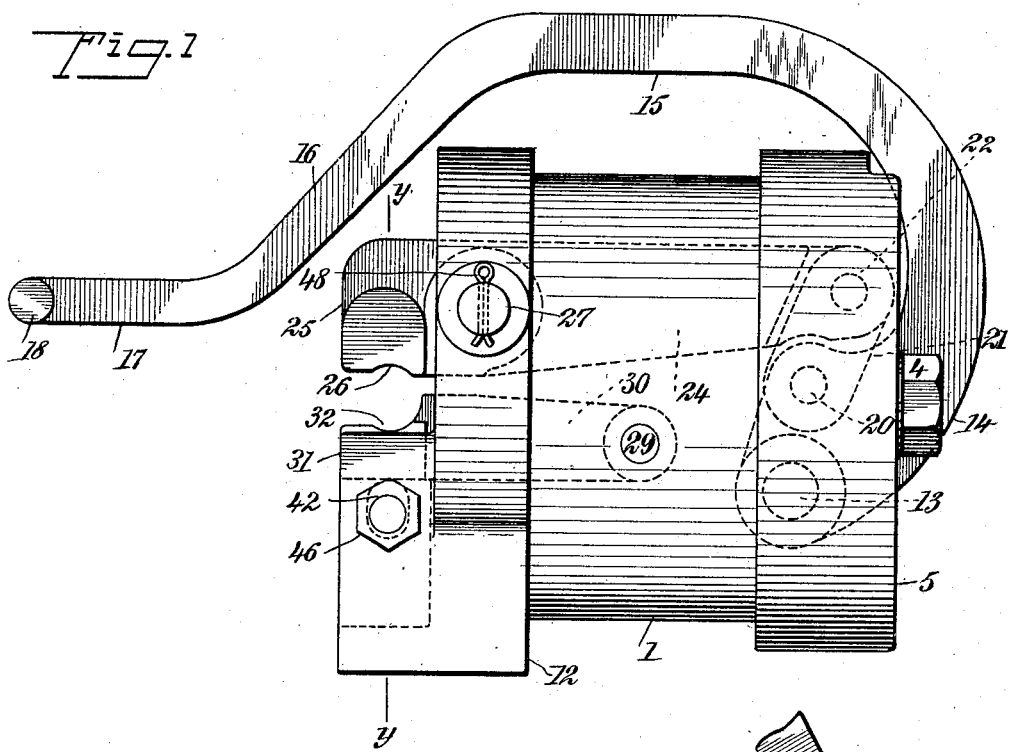
Figure 2:
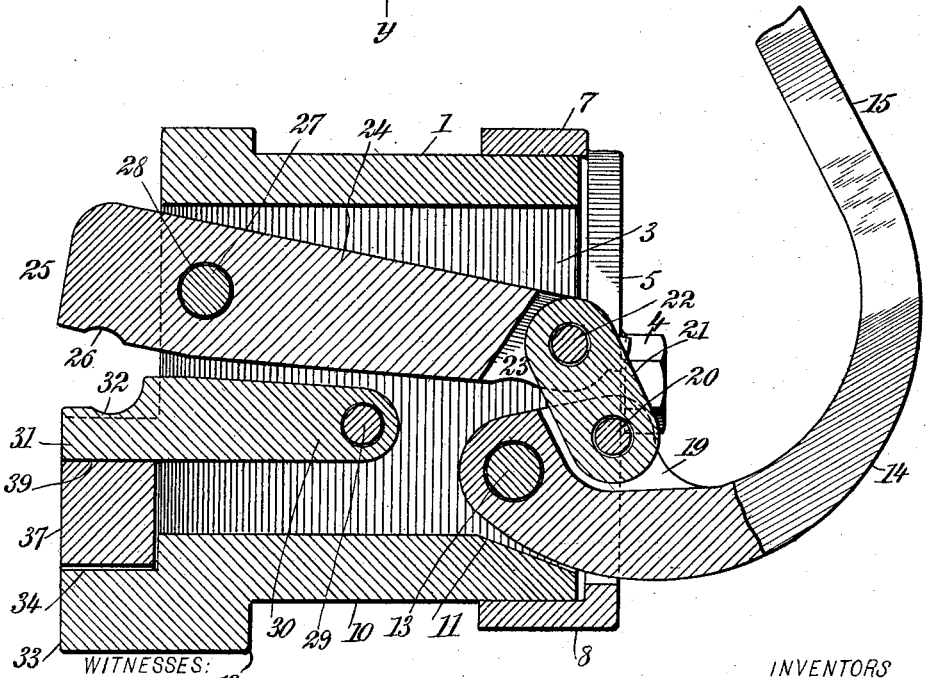

Figure 1 is an end view of a clutch or gripping device constructed in accordance with our improvements, said view indicating the parts in the positions occupied thereby after the oscillating jaw has been caused to be moved into operative position relatively to the stationary jaw for the purpose of effecting a grip upon a rope or cable. Fig. 2 is a transverse sectional view taken on the line *x x* of Fig. 3, the hand-lever being shown broken off. Fig. 3 is a vertical longitudinal sectional elevation on the line *y y* of Fig. 1, and Fig. 4 is a horizontal sectional plan view taken on the line *z z* of Fig. 3.

Before proceeding with a more detailed description it may be stated that our improved cable grip or clutch device comprises practically a block of metal of proper dimensions or size formed all the way through the same with an opening or compartment, in the adjacent side walls of which the principal operative elements of our improvements have their bearings or supports. Said elements are constituted mainly of a movable or oscillating jaw and a stationary jaw combined with an operating-lever and connections therefor to said movable jaw, and we also employ suitable means whereby the stationary jaw may be adjusted with reference to the movable jaw to suit varying needs or requirements of use of the device. The parts are simple in construction and compactly organized, and they may be readily taken apart for any desired purpose, it being understood that while we have herein shown a certain preferred embodiment thereof we do not limit ourselves thereto in practice, since immaterial changes therein may be resorted to coming within the scope of our invention. Attention is also called to the fact that in practice we may employ any suitable devices or mechanism for automatically tripping the operating-lever herein shown, thereby to release the jaws from the cable at any desired points or stations, though we have not deemed it necessary to illustrate any such devices or mechanism herein. Any preferred means may be employed for connecting our improved grip device with a bracket, car, or other contrivance carried by the cable.

Specific reference being had to the drawings by the designating characters marked thereon, 1 represents a block or body of metal approximately rectangular in shape and formed therethrough transversely with an opening or compartment 2, the surfaces of the side walls 3 3 of which are preferably straight or vertical, as shown. Detachably secured to one side of the said block 1 by means of screw-bolts 4 4 entering openings therefor in the block is a clamp or cap 5, having side flanges 6 6 and upper and lower flanges 7 and 8, these said flanges fitting upon portions of the sides of the said block or body, as shown. This clamp or cap has an opening 9 therein corresponding to the compartment 2 in the block 1, (see Fig. 4,) said opening being for the accommodation and working of the operating-lever, hereinafter mentioned. The base 10 of compartment 2 is beveled at 11, and the part 12 of said base is also specially constructed, both for the purposes also hereinafter specified. Having its bearings in the side walls 3 3 of the compartment 2 is a pin 13, upon which is loosely fitted the inner end of a curved hand-lever 14, said lever extending upwardly, thence transversely at 15, and finally curved downwardly at 16, thence outwardly at 17, and provided at the free end thereof with a handle or cross-piece 18, the particular shape of said lever furnishing efficient results by the expenditure of comparatively limited force or power and said lever being permitted to have all necessary movement by means of the said beveled portion 11 of the said base 10 and the opening 9 in the said clamp in cap 5. This lever is preferably formed near the inner end or part thereof with duplicate or opposite cheek-pieces 19, between which are supported the ends of a pin 20, on which is loosely held or mounted the lower end of a toggle-link 21, the upper end of which is loosely suspended on a similar pin 22, having its ends supported in cheek-pieces, such as indicated at 23, formed by the bifurcated end of the shank 24 of a movable or vertically-oscillating jaw 25, which jaw is notched or grooved on its under side at 26 to adapt the same to a rope or cable. (Not shown.) The said shank 24 is loosely mounted on a pin 27, supported in the side walls 3 3 of the block 1 near one side of the latter, and which pin passes through an opening 28 in said shank, formed quite close to the said jaw 25, thereby gaining increased length of the shank, from which, as is apparent, considerable leverage is derived from comparatively a limited force applied to the hand-lever 14. Also supported in the side walls 3 3 is a pin 29, located substantially intermediate the said pins 13 and 27, and upon which is movably held the inner end of the shank 30 of a stationary jaw 31, the upper surface of which jaw is grooved at 32 to also adapt the jaw to a cable.

In order to render our improved cable grip or clutch device equally operative with ropes or cables of different diameters or sizes, as well as for other reasons, we preferably provide means whereby said stationary jaw may be adjusted relatively to the movable jaw, and while such means may be variously constructed we preferably employ the embodiment herein shown. Thus on referring to Figs. 2 and 3 it will be seen that the base 10 of the compartment 3 is provided at one edge thereof with a ledge 33, the upper surface 34 of which is beveled or inclined upwardly from the point 35 to the point 36, (see Fig. 3,) and seated upon said surface is an adjustable wedge 37, which is beveled or inclined on its under surface at 38 in conformity with such surface, the upper surface 39 of said wedge being preferably flat and straight, as shown, and constituting a support upon which the stationary jaw 31 rests. The said ledge 33 is formed at the sides thereof with upright portions 40 and 41, each having an opening 42 therein, through one of which passes a right-hand screw 43 and through the other of which passes, preferably, a left-hand screw 44, said screws each entering an adjacent side of said wedge, as shown, and each having thereon an adjusting-nut 45 and a lock-nut 46, said nuts 45 abutting onto surface portions of the said ledge 33. It is apparent that by loosening the nuts on each of the screws and then moving the wedge 37 either upwardly or downwardly upon the inclined surface 34 the said stationary jaw may be adjusted to any desired extent, after which the said screws may be again properly set or tightened, by which to secure said parts in their adjusted relationship.

The pin 27 is held in place in any suitable way, as by means of cotter-pins 48, and it will be seen that access to the several operative elements or parts may readily be had either for removal or repair of the same or for any other purpose.

Having thus described our invention, we claim as new and desire to secure by Letters Patent—

1. A cable grip or clutch device, comprising a block or body having therein a compartment, the base of the latter being formed at one edge thereof with a projecting ledge, having an upwardly-inclined surface from end to end, a wedge slidable on said surface, a movable jaw having a shank working in said compartment, a stationary jaw resting upon said wedge, an operating-lever for the movable jaw, and means for securing the wedge in different positions, said means being constituted of upright portions at the ends of the ledge, each having an opening therein, and right and left hand screws passing through said openings and entering opposite sides of the wedge, said screws having adjusting devices thereon.

2. A cable grip or clutch device, comprising a block or body having therein a compartment, the base of the latter being formed at one edge with a projecting ledge, having an upwardly-inclined surface extending from end to end thereof, a wedge slidable on said surface, a movable jaw having a shank supported in the compartment, between the side walls thereof, a stationary jaw resting on the wedge and having a shank also supported between said walls, an operating hand-lever likewise movably supported between these walls, a movable connection between the inner end of said lever and the shank of the movable jaw, and means for securing the wedge in different positions in effecting adjustments of the stationary jaw.

3. A cable grip or clutch device, comprising a block or body having therein a compartment, the base of the latter being formed at one edge with a projecting ledge, having an upwardly-inclined surface extending from end to end thereof, a wedge slidable on said surface, a movable jaw having a shank supported in the compartment, between the side walls thereof, a stationary jaw resting on the wedge and having a shank also supported between said walls, an operating hand-lever likewise movably supported between these walls, a movable connection between the inner end of said lever and the shank of the movable jaw, and means for securing the wedge in different positions in effecting adjustments of the stationary jaw, said means being constituted of uprights at the ends of the wedge, each having an opening therein, and right and left hand screws passing through said openings and entering opposite sides of the wedge, said screws having adjusting devices thereon.

In testimony whereof we have signed our names to this specification in the presence of two subscribing witnesses.

LUDWIG SCHULER.
JOSEPH ERICSON.

Witnesses:
W. B. VAN ATLA,
FRED B. VAN ATLA.